Feb. 8, 1966  H. M. OGLE  3,234,100
FILM BOILING INDICATOR
Filed May 8, 1961  2 Sheets-Sheet 2
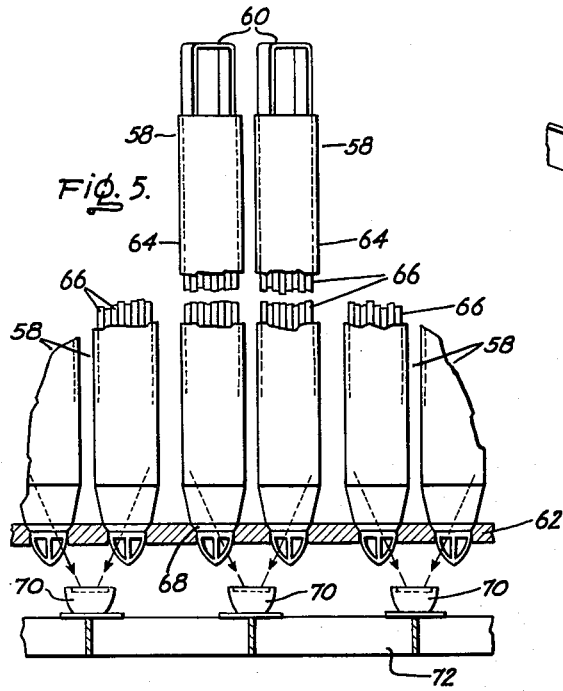
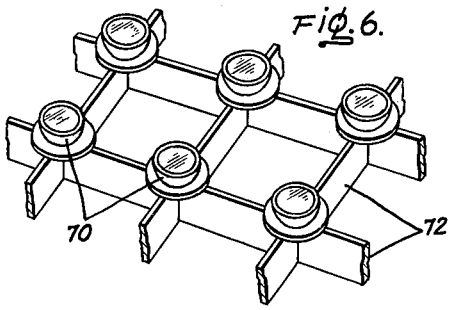
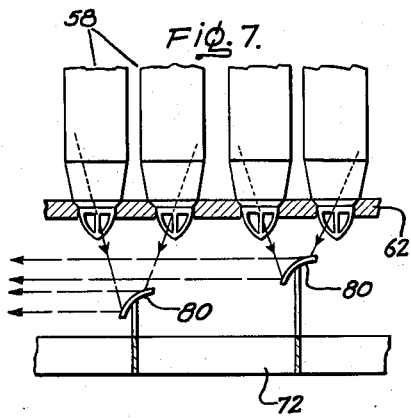
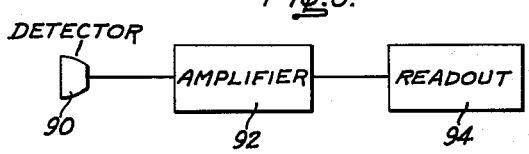
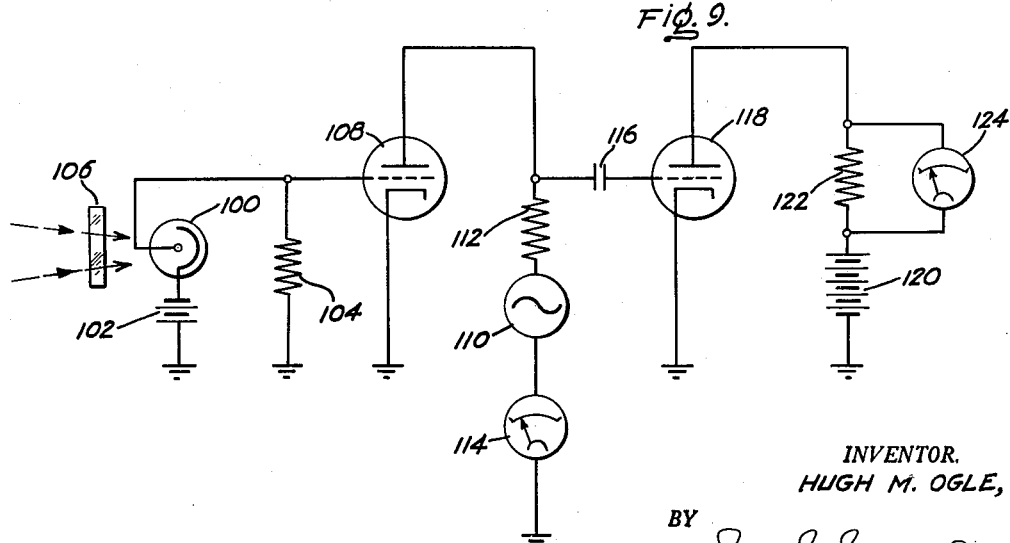
INVENTOR.
HUGH M. OGLE,
BY
ATTORNEY.

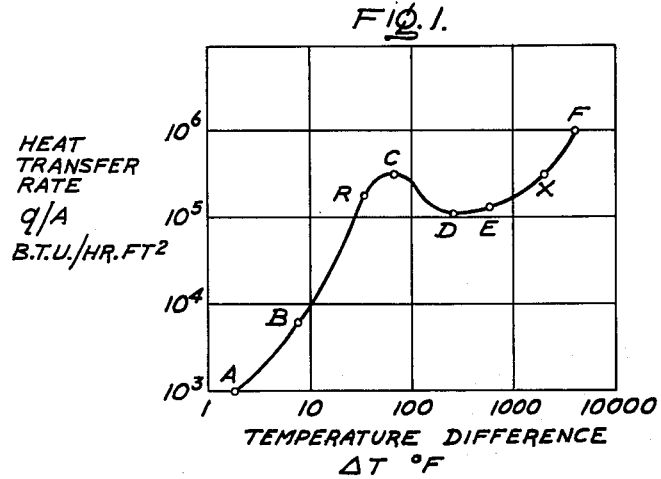
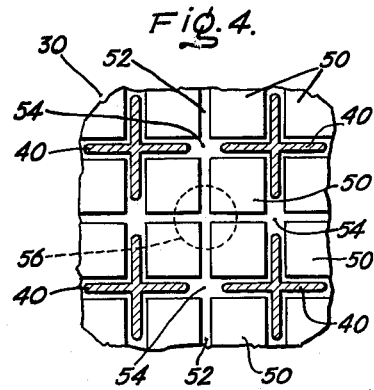
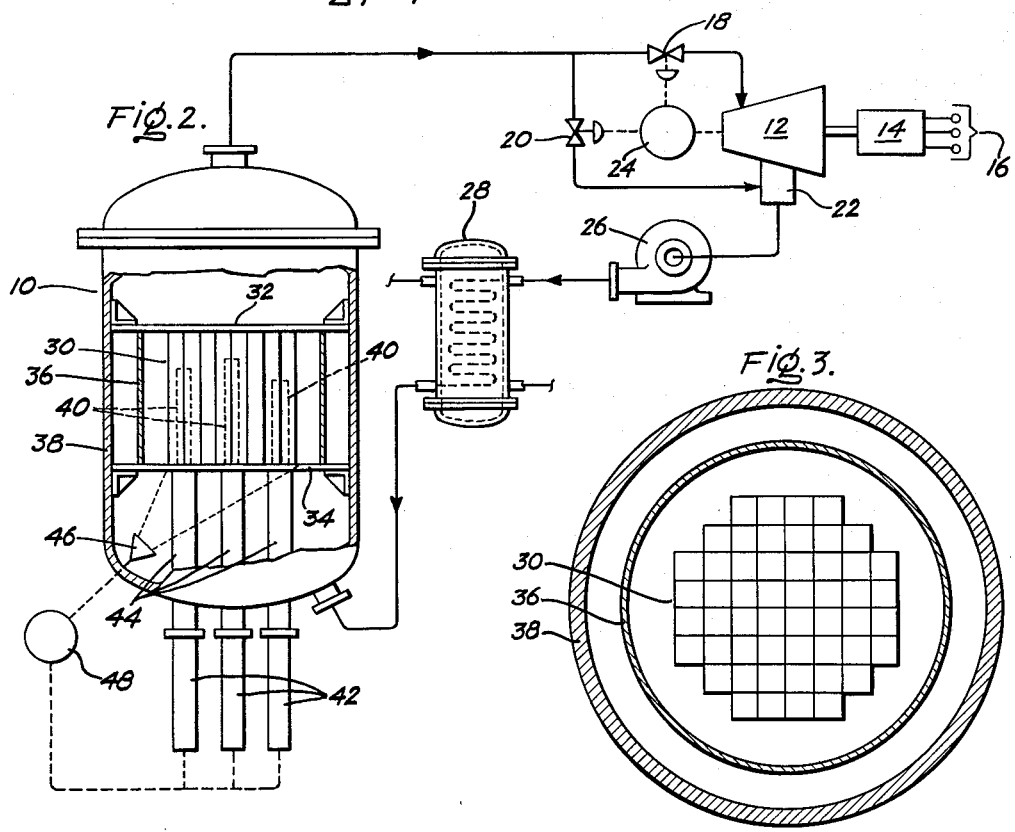
INVENTOR.
HUGH M. OGLE,
BY *[signature]*
ATTORNEY.

United States Patent Office 3,234,100
Patented Feb. 8, 1966

3,234,100
FILM BOILING INDICATOR
Hugh M. Ogle, Palo Alto, Calif., assignor to General Electric Company, a corporation of New York
Filed May 8, 1961, Ser. No. 108,653
9 Claims. (Cl. 176—19)

This invention relates broadly to the conversion of mass to energy through neutron induced nuclear fission chain reactions, and it relates more particularly to the detection of film boiling within a volatile liquid cooled nuclear reactor and to the detection of regions of excessive temperature on the surfaces of fuel elements.

The release of large amounts of energy through nuclear fission chain reactions is now quite well known. In general, a fissionable atom, such as U-233, U-235, or Pu-239, absorbs a thermal neutron in its nucleus and undergoes a nuclear disintegration. This produces on the average, two fission products of lower atomic weight and great kinetic energy, and usually two or three high energy neutrons. For example, the fission of U-235 produces a light fission product and a heavy fission product with mass numbers ranging between 80 and 110 and between 125 and 155 respectively, an average of 2.5 neutrons, and some energetic gamma radiation. The total energy release approaches about 200 mev. (million electron volts) per fission event.

The kinetic energy of the fission products and neutrons is quickly dissipated in the fuel and other ambient material, including neutron moderator, as heat. If after this heat generation there is at least one net thermal neutron remaining which induces a subsequent fission, the fission reaction becomes self-sustaining and the heat generation is continuous. The heat is removed by passing a coolant fluid, which may also be a neutron moderator, through heat exchange relationship between the fuel material and a heat sink. Typical non-metallic, neutron moderating liquid coolants include light (natural isotopic mixture of $H_2O$ and $D_2O$) water, heavy (primarily $D_2O$) water, organic liquids such as the isomeric mixture of terphenyls and related refractory (aromatic) hydrocarbons. The reaction may be continued as long as sufficient fissionable material remains in the system to override the effects of the fission products which also may be present.

In order to maintain such fission reactions at a rate sufficient to generate usable quantities of thermal energy, nuclear reactors are presently being designed, constructed, and operated in which the fissionable material or nuclear fuel is contained in fuel elements which may have various geometric shapes, such as plates, tubes, or rods. The fuel material is usually enclosed in a corrosion-resistant, non-reactive, heat-conductive container or clad which contains no fissionable or fertile material. The elements are assembled together in a lattice at fixed distances from each other in a coolant flow channel or region forming a fuel assembly, and sufficient fuel assemblies are combined in the presence of neutron moderating material to form the nuclear fission chain reacting assembly or reactor core capable of the self-sustained fission reaction referred to above. The core is enclosed within a reactor vessel through which a coolant is passed.

The clad serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common clad materials are stainless steel, aluminum and its alloys, zirconium and its alloys, niobium (columbium) and its alloys, certain magnesium alloys, and others. The failure of the clad, due to the build-up of gas pressure or high temperatures in the fuel, can contaminate the coolant or moderator and the associated systems with intensely radioactive long-lived products to a degree which interferes with plant operation.

The power output of a reactor is frequently limited by the maximum fuel element surface temperature within the reactor. As the reactor power is increased, the fuel element surface temperature increases slowly while heat is being removed from the fuel elements by the flowing coolant liquid. At still higher power levels, nucleate boiling of the coolant assists removal of heat from the fuel. Under these conditions heat is removed from the surface of the fuel element primarily by conduction through and convection by the coolant within the reactor. However, when the reactor power reaches a certain critical point, the amount of heat being transferred from the fuel element becomes so great that film boiling occurs, that is, substantial regions of the fuel element surface become blanketed with gaseous fluid, rather than liquid. In a boiling water reactor, the surfaces will become blanketed with steam. This steam, or gaseous water, cannot remove heat from the surface of the fuel elements by conduction and convection at as high a rate as can the liquid water due to its reduced heat transfer coefficient, and thus the fuel surface temperature rises necessarily to high values at which thermal radiation becomes a major heat transfer mechanism. Under these circumstances the temperature differential between the fuel element surface and the water is much greater than that characteristic of nucleate boiling to maintain the same rate of heat transfer.

For example, zirconium cladding may have a surface temperature of approximately 600° F. when a boiling water reactor is operating under a condition of normal nucleate boiling at about 1000 p.s.i.a. If film boiling occurs, this surface temperature will rise at a rate of about 1000° F. per second and will reach an equilibrium temperature of about 2500° F. if the same rate of heat transfer is to be maintained. As the melting point of zirconium is about 3300° F., this equilibrium condition may exist for some time, although, of course, chemical and metallurgical processes will be accelerated by this high temperature and continued operation of the reactor at such high temperatures would be detrimental to the reactor.

In a boiling water reactor, the occurrence of film boiling makes burnout (melting and physical destruction) of fuel elements possible. Present power reactor constructions rely on careful design, manufacture and operation to avoid fuel element burnout. Even after this care has been exercised, a substantial safety margin must be provided because an operator has no way of knowing what the actual margin is. If burnout does occur, fission products will be released into the system and reactor shutdown and repair will be required, with these repairs being dangerous, time consuming, and expensive.

It is accordingly an object of this invention to provide means for detecting and indicating the occurrence of film boiling in a nuclear reactor.

It is another object of this invention to provide means for detecting regions of excessive temperature on the surface of fuel elements in nuclear reactors.

It is another object of this invention to provide means for detecting and indicating the occurrence of film boiling in a boiling water reactor.

It is another object of this invention to provide means for detecting and indicating the occurrence of film boiling in a boiling water reactor immediately upon the occurrence of the film boiling.

It is yet another object of this invention to provide an indication of film boiling in a nuclear reactor so that the power level of the reactor may be reduced before any damage is caused to the reactor.

When film boiling does occur in a nuclear reactor, the surface temperature of the fuel elements rapidly increases. This rapid increase in temperature results in the transfer of heat from the surface of the fuel elements to the coolant by radiation. This thermal radiation has been found to have a significant amount of energy in the infrared and visible (particularly red) region of the spectrum, hereafter collectively referred to as red radiation. In accordance with one embodiment of the invention, a detector responsive to this red radiation is positioned within the reactor to view the fuel elements. For example, the detector may be positioned axially away from the upper or lower end of the fuel elements. This detector upon sensing such red radiation provides an indication of film boiling which is applied to alert an operator to the presence of film boiling, so that the operator may reduce the power level of the reactor. Alternatively, means are provided which are automatically responsive to the indicated presence of such red radiation to reduce the power level of the reactor to a safe level.

For complete understanding of the invention, reference may be had to the accompanying figures, in which:

FIGURE 1 shows, in graphical form, the relation between the temperature differential between the fuel element surface and the coolant in a nuclear reactor and the heat transfer rate between the fuel elements and the coolant in the reactor;

FIGURE 2 shows, in schematic and partial section form, a power generating system utilizing a boiling water reactor which employs a film boiling indicator according to the invention;

FIGURE 3 shows a cross-sectional view of the boiling water reactor of FIGURE 2;

FIGURE 4 shows a detail of a portion of the cross-sectional view of FIGURE 3, showing the position of a film boiling indicator according to the invention;

FIGURE 5 shows a detail of the mounting arrangement of one embodiment of a film boiling indicator in accordance with the invention;

FIGURE 6 shows a portion of a grid upon which detectors utilized in accordance with the invention may be positioned to view the fuel elements in a nuclear reactor;

FIGURE 7 shows a view similar to that of FIGURE 5 showing another embodiment of a film boiling indicator in accordance with the invention;

FIGURE 8 shows, in block diagram form, a film boiling indicator in accordance with the invention; and FIGURE 9 shows a circuit diagram of a film boiling indicator in accordance with the invention.

FIGURE 1 shows, in graphical form, the relation between the fuel element surface to coolant temperature differential and the rate of heat transfer between the surface of the fuel elements and the coolant in a nuclear reactor.

Referring now to FIGURE 1, the region between points A and B represents a region of non-boiling, and heat is removed from the surface of the fuel elements by natural convection of the coolant, which may be water. In the region between the points B and C, nucleate boiling is occurring and heat is being transferred from the surface of the fuel elements by conduction and convection through the boiling liquid water in contact with the fuel element surface. In the region between the points C and D, the surface area of the fuel elements becomes partly insulated by a gaseous film of steam, and thus the rate of heat transfer from the surface decreases, even though the temperature differential increases. Point D represents the Leidenfrost or minimum heat transfer rate point in the region. In the region between points E and F film boiling occurs and at this time heat transfer from the surface of the fuel elements is by combined conduction and thermal radiation through the film of steam surrounding the surface of fuel elements. Point F corresponds to the melting point of the fuel cladding, which may be, for example, zirconium or stainless steel.

Film boiling in a boiling water reactor may occur as follows: Consider that a boiling water reactor is operating at point R on the graph of FIGURE 1, with this point being in the region of nucleate boiling. If for some reason, the power output of the boiling water reactor must be increased, the rate of heat transfer between the surface of the fuel elements and the boiling water will increase, and the operating point will move closer to the point C. In nuclear fuel, the rate of heat generation is determined by the product of the thermal neutron flux and the enrichment of the nuclear fuel, and the fuel temperature and heat transfer rate vary to balance it. Thus, when the operating point reaches the point C and its corresponding value of rate of heat transfer, the operating point on the curve will suddenly shift to point X, with a resultant large increase of temperature differential between the surface of the fuel elements and the boiling water.

For example, suppose a boiling water reactor is operating at a pressure of 1000 p.s.i. At this pressure the boiling temperature of water is 546° F. Thus, when the reactor fuel is operating at the point R, and the R point represents a temperature differential of 54°, the surface temperature of the fuel element is about 600° F. At this temperature the thermal energy is radiated from the surface of the fuel element at a rate of about only two watts per square inch and the maximum energy wave length of the radiated energy is about 5 microns. This is to be contrasted with the visible light spectrum range of about 0.4 to 0.7 micron. Thus, when the reactor fuel is operating at the point R, essentially no thermal energy is radiated from the surface of the fuel element, or is in the visible light range.

However, as was previously shown, when the power output of the reactor increases beyond a certain point, film boiling occurs and the operating point of the reactor fuel will jump in a matter of a few seconds to the point X which represents a surface temperature of the fuel elements of about 2500° F. This equilibrium temperature is required in order to dissipate the generated heat by radiation and conduction through the steam blanket whose heat transfer coefficient is much lower than that of the boiling water of point R. At a temperature of about 2500° F., the thermal energy radiation rate from the surface of the fuel elements is about 100 watts per square inch, with the maximum energy wave length being about 1.8 microns. Such an energy spectrum has a substantial portion of red radiation, and about 10% of this energy, or 10 watts per square inch has a wave length less than 0.7 micron and thus falls in the visible light spectrum. This red radiation emitted from the surface of the fuel elements whenever film boiling occurs, is, in accordance with the invention, detected as an indication of film boiling.

FIGURE 2 shows an electrical generation system which includes a boiling water reactor utilizing a film boiling indicator in accordance with the invention. Thereby is shown a boiling water reactor 10, which generates steam which is delivered to a turbine 12 which in turn drives an electric generator 14, which delivers electric power to output terminals 16. The steam may be delivered through an admission valve 18 directly into a turbine 12, or it may pass through a bypass valve 20 into a condenser 22 which is associated with the turbine 12. The admission valve 18 and bypass valve 20 may be controlled by the load responsive controller 24. Condensate from the condenser 22 may be pumped by a condensate pump 26 through a feedwater heater 28 and returned to the boiling water reactor 10.

The boiling water reactor 10 includes a reactor core 30, which is composed of a plurality of nuclear fuel assemblies supported by an upper grid 32 and a lower grid 34. A thermal shield 36 surrounds the reactor core 30 and the entire reactor is enclosed in a vessel 38. A plurality of reciprocable control rods 40 are positioned within the reactor core, with the position of these control rods being determined by a plurality of control rod drives 42 operating through control rod guide tubes 44.

As was previously described, when film boiling occurs within the reactor, radiant energy in the visible light and infrared spectrum will be emitted from the surface of the fuel elements. In accordance with the invention, a detector 46, which may be an optical or infrared detector, is positioned within the boiling water reactor 10 at such a location that it can view the fuel elements which compose the reactor core 30. The detector 46 will detect the presence of the radiated energy and will thus be an indication of film boiling occurring within the reactor 10. Suitable instrumentation 48 may alert an operator to the presence of the film boiling which is detected by the detector 46, such that the operator may reduce the power level of the reactor 10, or the instrumentation 48 may directly control the control rod drives 42 in such a manner as to reduce the power level of the reactor 10 whenever film boiling is detected by the detector.

The position of the detector 46 is shown schematically in FIGURE 2. Of course, the detector 46 may be positioned at any spot within the reactor 10 from which it may view the fuel elements. However, because the reactor core 30 is surrounded by a thermal shield 36 and because the individual fuel elements are ordinarily surrounded by tubular flow channels and control rods, the optical detector 46 can best view the fuel elements from positions located axially away from the lower or upper end of the fuel assembly. Thus, the detector 46 or a plurality of detectors, if such is desired, may be positioned axially below the reactor core 30, as is shown in FIGURE 2, or alternatively but not shown, may be positioned axially above the reactor core 30.

Detection of the radiation by the detector 46 is accomplished in the presence of Cerenkov radiation, which is visible light in the blue part of the spectrum and is emitted from irradiated fuel in the cores of atomic reactors. However, the amount of blue Cerenkov radiation present in a core is small when compared to the amount of infrared and red radiation emanating from the core when film boiling occurs. For example, in a core suitable for powering a 150,000 kilowatt electrical power system, the total amount of visible light produced by Cerenkov radiation is about 6 watts. Also, since this radiation is predominantly blue, as opposed to the predominately red radiation emitted during film boiling, and since it varies as a function of reactor power but not as a function of film boiling, it is easily possible to distinguish between the presence of red radiation due to film boiling and the Cerenkov radiation.

Suitable detectors which may be used include vacuum photo cells having photo emissive cathodes, a vacuum photo cell used in conjunction with an electron multiplier tube, an optical thermopile, a television camera, or a semi-conductor type of detector. If a detector is used which is not inherently sensitive to the desired spectrum range, a red filter may be used in conjunction with the detector to assure that the detector will be responsive only to the desired radiation.

FIGURE 3 shows a cross-sectional view of a typical boiling water reactor. The reactor core 30 therein is surrounded by a thermal shield 36, and the entire reactor is enclosed in a vessel 38. The reactor core 30, shown schematically, comprises a plurality of fuel assemblies and has a plurality of control rods interspersed between the fuel assemblies.

FIGURE 4 shows a detail of a portion of a cross-section of a reactor core 30 as shown in FIGURE 3. Therein is shown an illustrative core lattice having a plurality of fuel assemblies 50 having control rods 40 positioned therebetween. Fuel assemblies 50 are arranged in groups of four closely separated by relatively narrow space 52. The groups of four assemblies are separated by relatively wide space 54 in which control rods 40 are positioned. Each of the fuel assemblies 50 has a plurality of fuel elements, such as fuel rods, positioned for example, in a square six-by-six array (not shown).

In accordance with the invention, each group of four fuel assemblies 50 may have a detector associated therewith, such that not only the presence but also the location of any film boiling may be detected within the reactor. For example, detector 56 may be associated with fuel assemblies 50 shown centrally in FIGURE 4. The detector 56 may be axially spaced from the fuel assemblies 50 either above or below the fuel assemblies, so as to view any radiation which may be emitted by any of the fuel rods within those four fuel assemblies. In a like manner, a detector could be associated with each of the other fuel assembly groups contained in the reactor core 30.

FIGURES 5 and 6 show details of one form of the invention having a plurality of fuel assemblies and showing the positioning of the detectors axially beneath the fuel elements as illustrated in FIGURE 4. A plurality of fuel assemblies 58 are supported by lower support grid 62. Each fuel assembly 58 includes a flow channel 64 which is open at the top end thereof to allow coolant to flow therethrough. A bail 60 is also included which is attached to the top of each flow channel 64 to facilitate movement of the fuel assembly. A plurality of fuel rods 66 is enclosed within each flow channel 64. A nose piece 68 is positioned on the bottom of each fuel assembly 58 which is positioned between the openings of the lower support grid 62. The nose piece 68 includes openings therein to allow coolant to pass through. In accordance with the invention, a detector 70 is positioned between each group of four fuel assemblies 58 to view the fuel rods 66 through the openings in the respective nose pieces 68 to detect any red radiation which may be radiated from the fuel rods 66 as an indication of film boiling. The detectors 70 may be supported on a detector support grid 72.

FIGURE 7 shows a modified embodiment of the invention which is similar to that shown by FIGURES 5 and 6 except in that mirrors 80 replace the detectors 70 on the detector support grid 72. These mirrors 80 reflect optical radiation radiated from the fuel elements transversely across the region below the core to a detector or detectors which may be positioned near the vessel wall and out of the direct path of coolant flow. These mirrors may be made slightly convex to enlarge the field of view.

FIGURE 8 shows, in block diagram form, an instrumentation system which may be used with the invention. The system includes a detector 90, one or more amplifiers 92 and suitable readout instrumentation 94. The detector 90 may be a vacuum photo cell having photo emissive cathode, a vacuum photo cell used in conjunction with an electron multiplier tube, an optical thermopile which detects total radiation, a television camera, a semi-conductor optical detector, or other optical radiation detector. The semi-conductors which are suitable may include the variable resistance cells such as the well known selenium, cadmium, zinc sulfide, cadmium selenide, and the similar type of cells. The semi-conductor detectors may also include the so called barrier layer photo cells of the PN junction type; this including the silicon solar battery and the copper oxide optical detector. Preferably, a detector is utilized which is inherently sensitive to red radiation. However, if a detector is used which is sensitive to all radiation, a suitable red filter device may be used in conjunction with the detector to render the detector sensitive primarily to the red radiation emitted by fuel elements during film boiling. The readout instrumentation 94 may include such devices as an indicator, recorder, alarm, actuator, or trip devices, whereby either an operator is alerted to the occurrence of film boiling or the control rods are automatically inserted into the reactor core to reduce the power level of the reactor.

FIGURE 9 shows a circuit diagram for an instrumentation system such as is shown in FIGURE 8. The circuit diagram includes a vacuum photo cell 100 which has a photo-emissive cathode as the detector or sensor. The voltage source 102 provides suitable biasing voltage for the detector 100 and the resistor 104 serves as a load element for the detector. A suitable red filter 106 is used in conjunction with the detector. Whenever light radiated from the fuel elements passes through the filter 106 and impinges upon the detector 100, a signal thereby appears across the resistor 104. This signal is applied to the control grid of the electron discharge device 108. Anode potential is applied to the discharge device 108 by the alternating voltage source 110. Any signal appearing across the resistor 104 will then be amplified by the discharge device 108 and will result in an amplified signal appearing across the resistor 112, which serves as a load element for discharge device 108. If desired, a readout device 114 may be included in series with the load element of the discharge device 108 in order to provide an indication of the presence of light upon the detector 100. If further amplification is desired, the signal appearing across the resistor 112 may be coupled by capacitor 116 to the control grid of electron discharge device 118. The use of the alternating voltage source 110 allows this capacitive coupling between stages of the amplifier. Anode potential for the electron discharge device 118 is provided by voltage source 120 and the resistor 122 serves as a load element for the discharge device 118. A suitable readout device 124, which may be, for example, an A.-C. voltmeter, provides an output indication for the amplifier.

While FIGURE 9 shows an amplifier using an A.-C. source for anode voltage in order to utilize A.-C. coupling, any suitable form of amplifier could be used with the invention. For example, any of the D.-C. amplifiers which are well known in the art may be used to amplify any signal from the detector 19. Further, the transistorized versions of such instrumentation may be substituted.

The circuitry shown in FIGURE 9 may be used with any of the detectors mentioned in conjunction with FIGURE 8 with the following modifications: If a television camera detector is utilized, the circuit will require the well known readout equipment for such cameras. If a PN type of semi-conductor detector is utilized, the first amplifier stage may be omitted and one electrode of the detector device may be grounded. When an optical thermopile is used, the instrumentation may include a self-balancing potentiometer which may provide any desired readout.

While the invention has thus been described and several embodiments shown, the invention is not limited to these shown embodiments. Instead, many modifications will be apparent to those skilled in the art which will lie within the spirit and scope of the invention. Any means for detecting the red thermal radiation by the fuel elements upon the occurrence of film boiling may be utilized with the invention and any means of providing an indication for the detector may be utilized. It is thus intended that the invention be limited in scope only by the appended claims.

I claim:

1. In a boiling water reactor having fuel elements which emit radiation in the visible spectrum during normal reactor operation and which emit additional visible radiation whenever film boiling occurs around said fuel elements, an optical detector positioned within said reactor to view said film elements so as to detect any such additional visible radiation emitted from said fuel elements, and means responsive to the detected visible radiation for indicating the presence of said detected radiation and thus the occurrence of film boiling.

2. In a boiling water reactor having fuel rods which emit radiation in the visible spectrum during normal reactor operation and which emit additional visible radiation whenever film boiling occurs around said fuel rods, an optical detector positioned in said reactor, said optical detector being axially positioned from said fuel rods such that said detector views said fuel rods and will detect any such additional visible radiation being emitted from said fuel rods, and means responsive to the detected visible radiation for indicating the presence of said visible radiation and thus the occurrence of film boiling.

3. In a boiling water reactor having a plurality of fuel elements which emit radiation in the visible spectrum during normal reactor operation and which emit additional visible radiation whenever film boiling occurs around said fuel elements, a plurality of optical detectors positioned in said reactor, each of said optical detectors positioned to view predetermined ones of said fuel elements, and means responsive to the detected additional visible radiation for indicating the presence of said detected additional visible radiation and thus the occurrence of film boiling within said reactor.

4. In a boiling water reactor having a plurality of fuel rods which emit radiation in the visible spectrum during normal reactor operation and which emit additional visible radiation whenever film boiling occurs around said fuel rods, a plurality of optical detectors positioned within said reactor, each of said detectors axially positioned from predetermined ones of said fuel rods such that each of said detector views said predetermined ones of said fuel rods, and means responsive to the detected additional visible radiation for indicating the presence of said additional visible radiation and thus the occurrence of film boiling within said reactor.

5. In a boiling water moderated and cooled nuclear reactor having a plurality of nuclear fuel elements arranged to sustain a chain nuclear fission reaction and to generate heat thereby for release to said boiling water by conduction and convection, the improvement which comprises at least one optical detector sensitive to red radiation positioned to view a predetermined fraction of said fuel elements, and means connected to said optical detector and responsive thereto upon detection of said red radiation from said fuel elements to provide an indication of the approach of at least some of said elements to an unsafe operating condition associated with film boiling of said coolant.

6. In a boiling water reactor having fuel elements which emit radiation in the visible spectrum during normal reactor operation and which emit infrared radiation whenever film boiling occurs around said fuel elements, an infrared detector positioned within said reactor to view said fuel elements so as to detect any such additional infrared radiation emitted from said fuel elements, and means responsive to the detected infrared radiation for indicating the presence of said infrared radiation and thus the occurrence of film boiling.

7. In a boiling water reactor having fuel rods which emit radiation in the visible spectrum during normal reactor operation and which emit infrared radiation whenever film boiling occurs around said fuel rods, an infrared detector positioned in said reactor, said infrared detector being axially positioned from said fuel rods such that said detector views said fuel rods and will detect any such infrared radiation being emitted from said fuel rods, and means responsive to the detected visible radiation for indicating the presence of said infrared radiation and thus the occurrence of film boiling.

8. In a boiling water reactor having a plurality of fuel elements which emit radiation in the visible spectrum during normal reactor operation and which emit infrared radiation whenever film boiling occurs around said fuel elements, a plurality of infrared detectors positioned in said reactor, each of said infrared detectors positioned to view predetermined ones of said fuel elements, and means responsive to the detected infrared radiation for indicating the presence of said infrared radiation and thus the occurrence of film boiling within said reactor.

9. In a boiling water reactor having a plurality of fuel rods which emit radiation in the visible spectrum during normal reactor operation and which emit infrared radiation whenever film boiling occurs around said fuel rods, a plurality of infrared detectors positioned within said reactor, each of said detectors axially positioned from predetermined ones of said fuel rods such that each of said detectors views said predetermined ones of said fuel rods, and means responsive to the detected infrared radiation for indicating the presence of said infrared radiation and thus the occurrence of film boiling within said reactor.

References Cited by the Examiner

UNITED STATES PATENTS

| | | | |
|---|---|---|---|
| 1,232,408 | 7/1917 | Thwing | 73—355 |
| 2,677,277 | 5/1954 | Machlor | 73—355 |
| 2,794,926 | 6/1957 | Watts et al. | 250—83 |
| 2,814,953 | 12/1957 | Callaghan | 73—355 |
| 2,989,638 | 6/1961 | Laudon et al. | 250—83 |
| 2,999,059 | 9/1961 | Treshow | 204—193.2 |
| 3,021,274 | 2/1962 | Fifield et al. | 204—154.34 |

OTHER REFERENCES

Leyse: AEC Document No. IDO–16118, Aug. 10, 1953, "A Proposal for an In-Pile Film Boiling Experiment in the MTR," pp. 5, 6, 10, 11, 20, 21 and 22.

Eckert et al.: "Heat and Mass Transfer," publ. by McGraw-Hill, 1959, pp. 345–347.

REUBEN EPSTEIN, *Primary Examiner.*

CARL D. QUARFORTH, OSCAR R. VERTIZ,
*Examiners.*